(12) United States Patent
Choi (10) Patent No.: US 12,388,576 B2
(45) Date of Patent: Aug. 12, 2025

(54) METHOD AND APPARATUS FOR MANAGING HARQ PROCESSES

(71) Applicant: ELECTRONICS AND TELECOMMUNICATIONS RESEARCH INSTITUTE, Daejeon (KR)

(72) Inventor: Sung Woo Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 427 days.

(21) Appl. No.: 17/965,489

(22) Filed: Oct. 13, 2022

(65) Prior Publication Data

US 2023/0136976 A1    May 4, 2023

(30) Foreign Application Priority Data

Oct. 29, 2021  (KR) .................. 10-2021-0147010
Sep. 6, 2022   (KR) .................. 10-2022-0112798

(51) Int. Cl.
*H04L 1/1812*    (2023.01)
*H04W 72/1263*   (2023.01)

(52) U.S. Cl.
CPC ....... *H04L 1/1812* (2013.01); *H04W 72/1263* (2013.01)

(58) Field of Classification Search
CPC ... H04L 1/1812; H04L 1/1864; H04L 1/1819; H04L 1/1822; H04L 1/1896; H04W 72/1263
See application file for complete search history.

(56) References Cited

U.S. PATENT DOCUMENTS

| 2021/0006318 | A1  |  1/2021 | Kim et al. |
| 2021/0028891 | A1* |  1/2021 | Zhou ................. H04W 4/40 |
| 2021/0044956 | A1  |  2/2021 | Kim |
| 2021/0336728 | A1  | 10/2021 | Selvanesan et al. |
| 2021/0376962 | A1  | 12/2021 | Thomas et al. |
| 2022/0045803 | A1* |  2/2022 | Lin ................. H04B 7/18513 |
| 2022/0086806 | A1* |  3/2022 | Lu .................... H04W 4/40 |
| 2022/0124767 | A1* |  4/2022 | Fu ................... H04L 1/1678 |
| 2023/0077055 | A1* |  3/2023 | Gou ................. H04L 1/1861 |
| 2023/0254068 | A1* |  8/2023 | Dutta ............... H04L 1/1822 370/329 |
| 2023/0370205 | A1* | 11/2023 | Maaref ............. H04L 1/1822 |
| 2024/0129068 | A1* |  4/2024 | Xu .................. H04W 72/23 |

FOREIGN PATENT DOCUMENTS

KR  10-2021-0114441  9/2021

* cited by examiner

*Primary Examiner* — Abdullahi Ahmed
(74) *Attorney, Agent, or Firm* — KILE PARK REED & HOUTTEMAN PLLC (57) ABSTRACT

A method for managing HARQ processes in a terminal of a mobile communication system supporting uplink, downlink, and sidelink transmission is provided. The method for managing HARQ processes includes: receiving a data source ID and a HARQ process ID set to at least one of the uplink, downlink, and sidelink transmission through a control channel; searching a new HARQ process ID mapped corresponding to the combination of the data source ID and the HARQ process ID with reference to the HARQ process table; and operating a HARQ process corresponding to the new HARQ process ID.

12 Claims, 10 Drawing Sheets

| Source ID | HARQ process ID | New HARQ process ID | HARQ process table |
|-----------|-----------------|---------------------|--------------------|
| 0×0  | 0 | 0 |
| 0×0  | 1 | 1 |
| 0×0  | 2 | 2 |
| 0×ff | 0 | 3 |
| 0×0  | 3 | 4 |
| 0×0  | 4 | 5 |
| ⋮ | | |
| | | N-1 |

620

N_MAX_Process

METHOD AND APPARATUS FOR MANAGING HARQ PROCESSES

CROSS-REFERENCE TO RELATED APPLICATION

This application claims priority to and the benefit of Korean Patent Application Nos. 10-2021-0147010, and 10-2022-0112798 filed in the Korean Intellectual Property Office on Oct. 29, 2021, and Sep. 6, 2022, the entire contents of which are incorporated herein by reference.

BACKGROUND OF THE INVENTION

(a) Field of the Invention

The present disclosure relates to a method and apparatus for managing hybrid automatic repeat and request (HARQ) processes, and more particularly, to a method and apparatus for managing HARQ processes in a mobile communication system supporting uplink and downlink as well as sidelink.

(b) Description of the Related Art

3rd Generation Partnership Project (3GPP) standardized long term evolution (LTE)-based vehicle-to-everything (V2X) technology in Release 14 and Release 15, and new radio (NR)-based V2X technology in Release 16. In LTE/NR-based V2X, a sidelink (SL) refers to direct communication between terminals without passing through a network.

The 5G system supports two operation modes for V2X communication. One is PC5 interface-based V2X communication, and the other is Uu interface-based V2X communication. The PC5 interface supports SL transmission for NR and LTE, and the Uu interface supports NR uplink (UL) and downlink (DL) transmission.

In general, since the SL is in the same position as the UL transmitted by the terminal, it can share transmission resources with the UL. In the NR standard, UL and SL have the same subcarrier spacing (SCS), and are transmitted in the same frequency band. The SL removes interference to the DL for other terminals by separating time/frequency resources of the SL and DL.

For time/frequency resource allocation for SL, SL of NR release 16 uses two modes of resource allocation method. In mode 1, the base station allocates and manages resources for SL, and in mode 2, the terminals autonomously create a resource pool, and select and use the resource.

Like the existing mobile communication system, the NR system uses hybrid automatic repeat request (HARQ) to improve transmission performance. Among HARQ techniques, soft combining allocates independent HARQ process IDs to individual transport block (TB) data.

The base station of 3GPP LTE/NR manages the HARQ process IDs for DL and UL transmission in the cell. Since the base station controls the DL and UL in the cell through scheduling, it may manage the HARQ process IDs from when the terminal is connected. This management is also possible in mode 1 for SL resource allocation. Since the base station knows the state of the HARQ processes of the terminals, it is possible to manage the HARQ process IDs including the SL.

On the other hand, when mode 2 for SL resource allocation is applied, the terminal transmitting data through the SL and the terminal receiving data through the SL must share the HARQ process IDs for data transmission. However, since there is no common base station managing the HARQ processes of the two terminals, the TX UE and the RX UE may not know the states of the HARQ processes. When an incorrect HARQ process ID is set, there may be an error in direct communication between terminals and may affect the HARQ processes of an existing DL.

SUMMARY OF THE INVENTION

The present disclosure has been made in an effort to provide a method and apparatus for managing HARQ processes capable of efficiently operating the HARQ processes in a mobile communication system supporting sidelink as well as uplink and downlink.

According to one embodiment, a method for managing HARQ processes in a terminal of a mobile communication system supporting uplink, downlink, and sidelink transmission is provided. The method for managing HARQ processes includes: receiving a data source ID and a HARQ process ID set to at least one of the uplink, downlink, and sidelink transmission through a control channel; searching a new HARQ process ID mapped corresponding to the combination of the data source ID and the HARQ process ID with reference to the HARQ process table; and operating a HARQ process corresponding to the new HARQ process ID.

The method for managing HARQ processes may further include: when there is no new HARQ process ID mapped corresponding to the combination of the data source ID and the HARQ process ID in the HARQ process table, generating a new HARQ process ID corresponding to the combination of the data source ID and the HARQ process ID; and mapping the generated new HARQ process ID to the combination of the data source ID and the HARQ process ID and storing the new HARQ process ID in the HARQ process table.

The method for managing HARQ processes may further include transmitting a full control signal notifying a full or full release of the HARQ processes to a data source corresponding to the data source ID based on the number of HARQ process IDs being used in the HARQ process table.

The transmitting a full control signal may include: comparing the number of HARQ process IDs used in the HARQ process table with a predetermined threshold; when the number of HARQ process IDs is equal to or greater than the predetermined threshold, generating a full control signal notifying a full of HARQ processes; and transmitting the full control signal through a control channel or a data channel.

The transmitting a full control signal may further include, when the number of the HARQ process IDs is less than the predetermined threshold, generating a full control signal notifying the full release of HARQ processes.

According to another embodiment, a method for managing HARQ processes in a data source for transmitting data of a mobile communication system supporting uplink, downlink, and sidelink transmission is provided. The method for managing HARQ processes includes: checking whether a full control signal notifying full or full release of the HARQ processes transmitted by a receiving terminal is received based on the number of HARQ process IDs used in a HARQ process table of the receiving terminal receiving the data; and determining whether to transmit data to the receiving terminal according to the full control signal, wherein a new HARQ process ID is stored in the HARQ process table corresponding to a combination of a data source ID, and a HARQ process ID allocated to the data.

The determining may include, when receiving a full control signal notifying the full of the HARQ processes, stopping transmission of data and a HARQ process ID allocated to the data.

The determining may include transmitting data, a data source ID of the data source, and an HARQ process ID allocated to the data, upon receiving a full control signal notifying full release of the HARQ processes.

The transmitting may include: transmitting the data through a data channel; and transmitting the data source ID and the HARQ process ID through the data channel or the control channel.

According to yet another embodiment, an apparatus for managing HARQ processes in a mobile communication system supporting uplink, downlink, and sidelink transmission is provided.

The apparatus for managing HARQ processes includes: a HARQ process table; a HARQ process ID convertor that receives a data source ID and a HARQ process ID set in at least one of the uplink, downlink, and sidelink transmission through the control channel, and searches a new HARQ process ID mapped corresponding to the combination of the data source ID and the HARQ process ID with reference to the HARQ process table; and a HARQ processor that operates a HARQ process corresponding to the new HARQ process ID.

The HARQ process ID converter, when there is no new HARQ process ID mapped corresponding to the combination of the data source ID and the HARQ process ID in the HARQ process table, may generate a new HARQ process ID corresponding to the combination of the data source ID and the HARQ process ID, may map the generated new HARQ process ID to the combination of the data source ID and the HARQ process ID, and may store the new HARQ process ID in the HARQ process table.

The HARQ processor may transmit a full control signal notifying a full or full release of the HARQ processes to a data source corresponding to the data source ID based on the number of HARQ process IDs being used in the HARQ process table.

The HARQ processor may generate a full control signal notifying a full of HARQ processes when the number of HARQ process IDs is equal to or greater than the predetermined threshold, and may generate a full control signal notifying the full release of HARQ processes when the number of the HARQ process IDs is less than the predetermined threshold.

The data source corresponding to the data source ID may indicate a base station or other terminal that has transmitted data.

DETAILED DESCRIPTION OF THE EMBODIMENTS

Hereinafter, embodiments of the disclosure will be described in detail with reference to the attached drawings so that a person of ordinary skill in the art may easily implement the disclosure. As those skilled in the art would realize, the described embodiments may be modified in various different ways, all without departing from the spirit or scope of the disclosure. The drawings and description are to be regarded as illustrative in nature and not restrictive. Like reference numerals designate like elements throughout the specification.

Throughout the specification and claims, when a part is referred to "include" a certain element, it means that it may further include other elements rather than exclude other elements, unless specifically indicated otherwise.

Expressions described in the singular herein may be construed as singular or plural unless an explicit expression such as "one" or "single" is used.

As used herein, "and/or" includes each and every combination of one or more of the recited elements.

In this specification, terms including an ordinal number, such as first, second, etc., may be used to describe various elements, but the elements are not limited by the terms. The above terms are used only for the purpose of distinguishing one element from another element. For example, without departing from the scope of the present disclosure, a first element may be referred to as a second element, and similarly, a second element may be referred to as a first element.

In the flowchart described with reference to the drawings in this specification, the order of operations may be changed, several operations may be merged, some operations may be divided, and specific operations may not be performed.

Furthermore, in this specification, each of the phrases such as "A or B", "at least one of A and B", "at least one of A or B", "A, B, or C", "at least one of A, B, and C", and "at least one of A, B, or C" may include any one of the items listed together in the corresponding one of the phrases, or all possible combinations thereof.

Now, a method and apparatus for managing HARQ processes according to an embodiment of the present disclosure will be described in detail with reference to the drawings.

Figure 1:
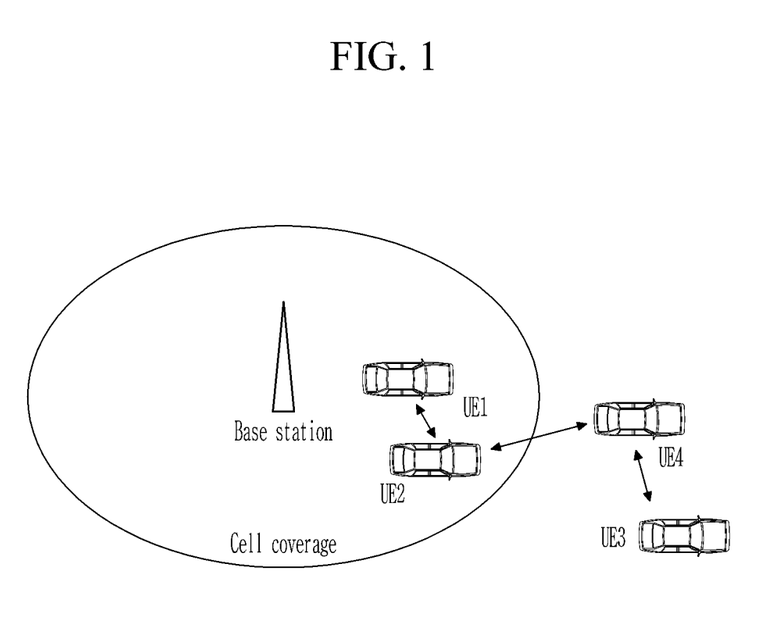
FIG. 1 is a diagram illustrating an SL environment of NR.

FIG. 1 is a diagram illustrating an SL environment of NR.

Referring to FIG. 1, UE1 and UE2 are within the coverage of a base station, and UE3 and UE4 are outside the coverage of the base station. UEs may communicate with an SL if necessary in a radio channel environment in which direct communication is possible.

A UE that transmits data in the SL is referred to as a TX UE, and a UE that receives data is referred to as an RX UE. A physical sidelink control channel (PSCCH), a physical sidelink shared channel (PSSCH), a physical sidelink feedback channel (PSFCH), a physical sidelink broadcast channel (PSBCH), a sidelink primary synchronization signal (S-PSS), and a sidelink secondary synchronization signal (S-SSS) can be transmitted in the SL. The S-PSS, S-SSS, and PSBCH are used for synchronization of UEs for SL.

PSBCH carries essential information required for SL, for example, an s1-time division duplexing (s1-TDD) configuration. This is to transmit an Uplink-Downlink (UL-DL) TDD configuration.

Transport block (TB) data transmitted by the TX UE is transmitted through the PSSCH. The RX UE may receive the PSSCH by receiving control information for receiving the PSSCH. This control information is defined as sidelink control information (SCI), and the SCI is divided into two types, SCI-1 and SCI-2. The SCI-1 informs the time and frequency resources of the PSSCH, the SCI-2 format, the PSSCH MCS, and the like, and is transmitted through the PSCCH. The SCI-2 includes HARQ parameters, source ID, target ID, PSSCH cast type indicator, channel state information (CSI) request, and the like, and is transmitted through PSSCH. The HARQ parameters includes a HARQ process ID, a new data indicator (NDI), a redundancy version (RV), and the like.

For time/frequency resource allocation for SL, SL in NR release 16 uses two modes of a resource allocation method. Mode 1 is a mode in which the base station allocates and manages resources for SL, and Mode 2 is a mode in which UEs autonomously generate a resource pool and select and use resources.

Since UE1 and UE2 are within the coverage of the base station, the resource allocation method according to mode 1 may be used. In mode 1, the base station allocates resources according to the requests of the UEs and manages the SL, so the corresponding UEs first access the cell of the corresponding base station and communicatively connect. Since both UE3 and UE4 are outside the coverage of the base station, only the resource allocation method according to mode 2 is possible. UE2 and UE4 perform SL transmission using mode 2 because UE4 is out of the coverage of the base station.

Like the existing mobile communication system, NR uses hybrid automatic repeat request (HARQ) to improve transmission performance. Among HARQ techniques, soft combining allocates an independent HARQ process ID to individual TB data. For soft combining, an RV and an NDI are additionally transmitted.

In a communication system using HARQ, data is channel-coded in TB units. The channel code encoder and channel code decoder have a plurality of HARQ processes, and allocate and manage a unique HARQ process ID according to an input TB.

In case of the UE receiving the DL, each HARQ process includes a process of performing decoding on the TB, transmitting a cyclic redundancy code (CRC) check result of the TB to the base station through the UL, and re-receiving the TB from the base station, and the each HARQ process is maintained during this process.

HARQ parameters for DL transmission in 3GPP LTE/NR are transmitted to the UE through PDCCH format 1 (PDCCH 1-0, PDCCH 1-1, and PDCCH 1-2). In the case of UL, the HARQ parameters are transmitted to the UE through PDCCH format 0 (PDCCH 0-0, PDCCH 0-1, and PDCCH 0-2). The HARQ parameters for SL transmission in NR are transmitted to the UE through SCI-2. SCI-2 includes HARQ process ID, NDI, and RV.

The number of DL maximum HARQ processes in NR may be specified by nrofHARQ-ProcessorForPDSCH among the serving cell specified RRC parameters. The nrofHARQ-ProcessorForPDSCH may be set to one of {n2, n4, n6, n10, n12, and n16}. Here, n2 represents two HARQ processes, and n4 represents four HARQ processes. If there is no nrofHARQ-ProcessesForPDSCH value, there are 8 HARQ processes. Accordingly, the number of DL maximum HARQ processes in NR may be one of 2, 4, 6, 8, 10, 12, or 16.

The base station in 3GPP LTE/NR manages the HARQ process IDs for DL and UL transmission in the cell. Since the base station controls the DL and UL in the cell through scheduling, the HARQ process IDs can be managed from when the UE is connected. This management is also possible in mode 1 for SL resource allocation. Since the base station knows the states of the HARQ processes of the UEs, it is possible to manage the HARQ process IDs including the SL.

On the other hand, when mode 2 for SL resource allocation is applied, the TX UE and the RX UE must share the HARQ process IDs for data transmission. However, since there is no common base station managing the HARQ processes of the two UEs, the TX UE and the RX UE may not know the states of the HARQ processes. When an incorrect HARQ process ID is set, there may be an error in direct communication between terminals and it may affect the HARQ processes of an existing DL, so this possibility should be avoided.

Figure 2:
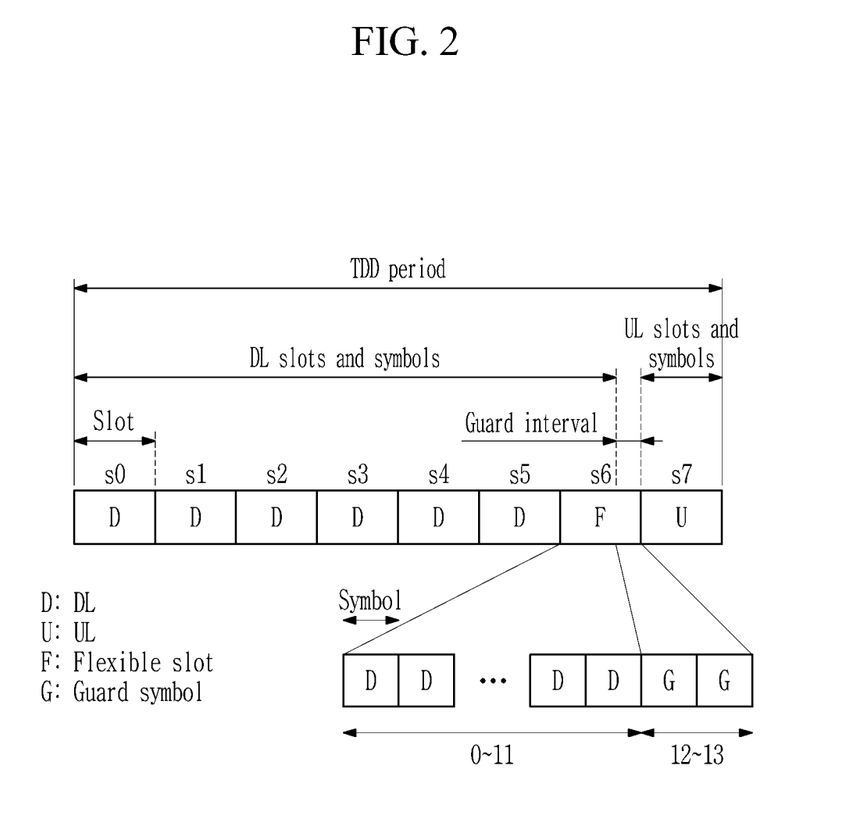
FIG. 2 is a diagram illustrating an example of a UL-DL TDD configuration.

FIG. 2 is a diagram illustrating an example of UL-DL TDD configuration.

Referring to FIG. 2, according to an example of the UL-DL TDD configuration, one TDD period includes 8 slots. That is, one TDD period includes 6 DL slots for DL transmission, 1 flexible slot, and 1 UL slot for UL transmission. One slot may consist of 14 symbols, some symbols of the flexible slot are allocated for DL transmission, and the remaining symbols of the flexible slot are allocated as a guard interval existing between DL transmission and UL transmission.

This UL-DL TDD configuration is an asymmetric configuration in which resources allocated to DL and UL are different from each other, and is used when the DL data rate is faster than the UL data rate.

Figure 3:
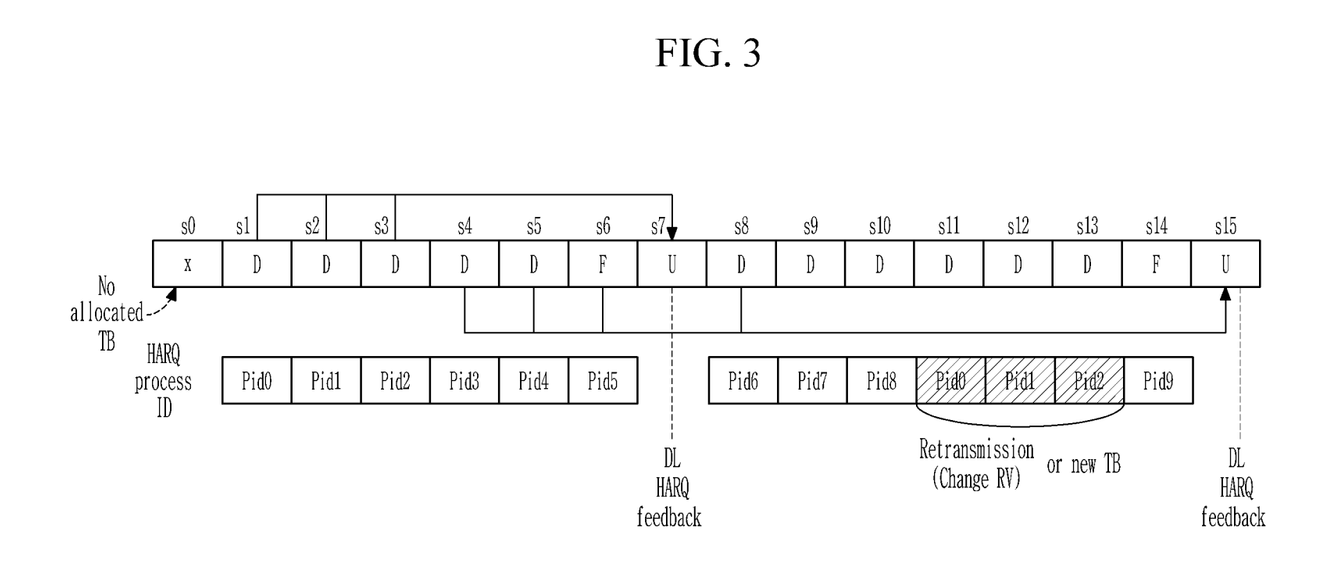
FIG. 3 is a diagram for explaining an example of setting HARQ process IDs in DL transmission.

FIG. 3 is a diagram for explaining an example of setting HARQ process IDs in DL transmission. FIG. 3 shows the UL-DL TDD configuration shown in FIG. 2, where slots s7 and s15 are allocated to the UL, and the remaining slots are allocated to the DL.

Referring to FIG. 3, the HARQ ACK for the DL TB transmitted in the slots s1, s2, and s3 may be transmitted along with the UL TB data in the slot s7. Similarly, in the slot s15, the HARQ feedback of the slots s4, s5, s6, and s8 may be transmitted.

The HARQ process IDs are allocated from the HARQ process for the DL of the slot s1.

A process ID 0 (Pid0), which is the HARQ process ID for the DL of the slot s1, is set to the HARQ process for the DL of the slot s1. When DL transmission is continuously performed, HARQ process IDs may be sequentially set to the HARQ processes for DL in the subsequent slots s2, s3, s4, s5, s6, s8, s9, and s10.

The UE transmits the CRC check result for the received TBs to the base station through the slot s7.

After receiving the HARQ feedback signal through the UL, the base station may transmit a new TB or retransmit the same TB according to whether the HARQ feedback signal is ACK or NACK. If the HARQ feedback is ACK, the base station may configure a new TB, and if the HARQ feedback is NACK, the base station may retransmit TB data of the corresponding HARQ process. In FIG. 3, it is assumed that the processing time required for the base station to transmit the TB according to the HARQ ACK feedback result is 4 slots. Accordingly, the base station may transmit TB data according to the result of the HARQ feedback to the UE from the slot s11, in which 4 slots have passed from the time of the HARQ feedback of the slot s7. In this case, for retransmission, the HARQ processes of slots s1, s2, and s3 receiving the feedback signal should be used, and according to an example, the HARQ process IDs Pid0, Pid1, and Pid3 for the DL of the slots s1, s2, and s3 should be used. Like the base station transmitting data, the UE receiving it operates with the same process ID.

Figure 4:
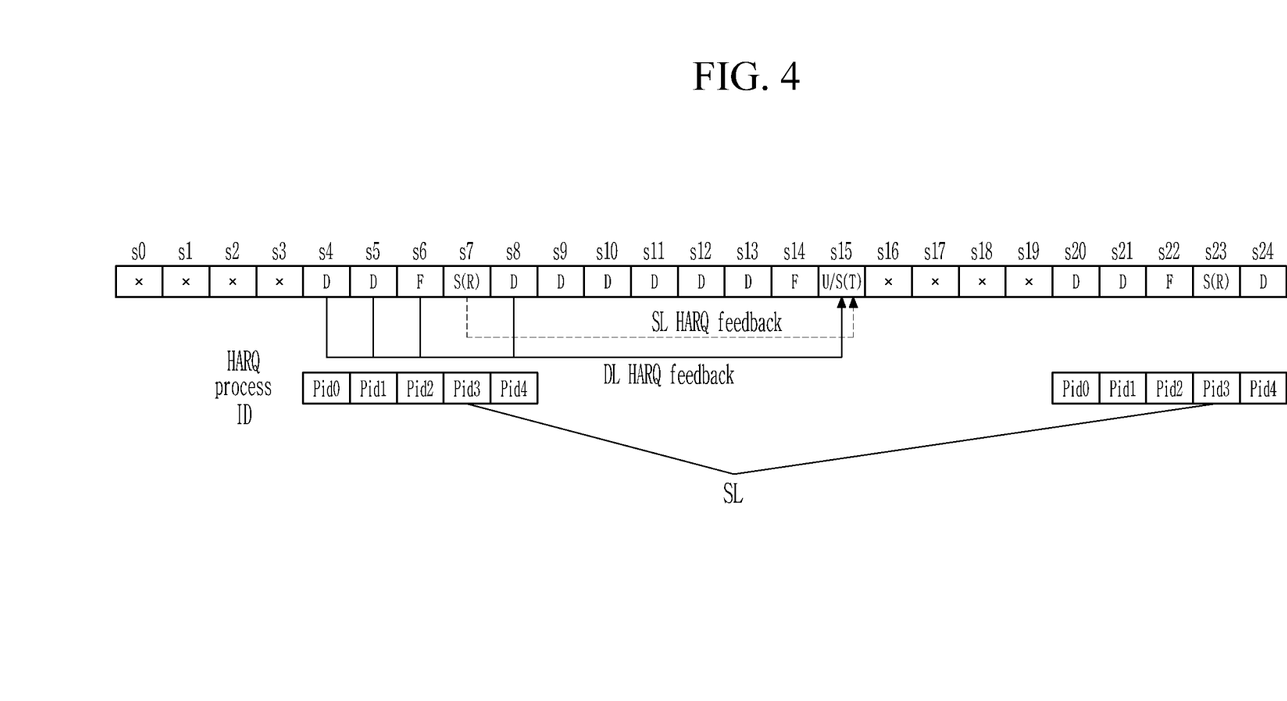
FIG. 4 is a diagram for explaining an example of setting HARQ process IDs when DL, UL, and SL coexist.

FIG. 4 is a diagram for explaining an example of setting HARQ process IDs when DL, UL, and SL coexist. In FIG. 4, it is assumed that UE1 and UE2 are connected to the base station as shown in FIG. 2, and DL TB data is transmitted in slots s4, s5, s6, and s8, and SL is transmitted in slot s7. In addition, S (R) indicates a case in which the corresponding UE receives the SL in the slot s7, and S (T) indicates the case in which the corresponding UE transmits the SL in the slot s15.

Referring to FIG. 4, the UE may set Pid0, Pid1, and Pid2 as HARQ process IDs to the DL TB data received in slots s4, s5, and s6 in which DL TB data are sequentially received, respectively. Next, Pid3 may be allocated as a HARQ process ID to the SL data received in the slot s7. Next, Pid4 may be assigned to the DL data received in the slot s8 as the HARQ process ID.

HARQ feedback for slots s4, s5, s6, s7, and s8 may be transmitted to the base station or other UEs in slot s15. TB data for the corresponding HARQ feedback may be retransmitted in slots s20, s21, s22, s23, and s24.

In this way, a UE that processes SL as well as UL and DL may use the existing HARQ processes used for UL/DL by adding the HARQ processes used for SL. In this case, as in mode 1, when the base station manages the scheduling of UL, DL, and SL in a cell, since the base station recognizes the states of the HARQ processes of UEs belonging to the cell, it is possible to appropriately allocate the HARQ process IDs.

Figure 5:
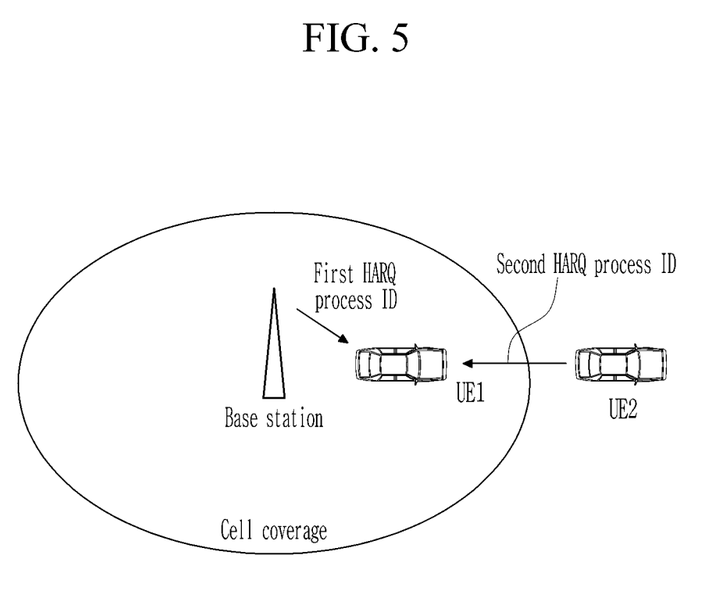
FIG. 5 is a diagram for explaining an example of setting HARQ process IDs in a communication system environment different from that of FIG. 4.

FIG. 5 is a diagram for explaining an example of setting HARQ process IDs in a communication system environment different from that of FIG. 4.

Referring to FIG. 5, only UE1 accesses the base station, the other UE2 is outside the cell coverage of the base station, and the UE1 and the UE2 communicate through the SL. In this case, mode 2 may be used as the resource allocation method for the SL.

UE1 uses DL slots when communicating with a base station and uses SL slots when communicating with UE2. In the case of DL, the base station transmits DL TB data and HARQ process ID (hereinafter, referred to as a first HARQ process ID) to UE1.

In the SL, when UE2 is a TX UE and UE1 is an RX UE, the TX UE transmits data and a HARQ process ID (hereinafter, referred to as a second HARQ process ID). In this case, UE1 operates according to the HARQ process ID set by UE2. Since UE1 is already connected to the base station through DL, when UE2 arbitrarily sets the HARQ process ID, the HARQ operation of UE1 may be disturbed. In case of mode 1, the base station managing all the UEs in the cell sets the HARQ process IDs, but unlike mode 1, since the HARQ process IDs are set in UE2, which does not know the status of UE1, it may interfere with HARQ operation of UE1 with the base station. Of course, in order to avoid this, a separate HARQ process group may be allocated for the SL and the HARQ process IDs within the separate HARQ process group May be used. However, in a situation where the total number of HARQ processes is determined, it is inefficient to determine a group of HARQ process for the SL regardless of DL/UL and SL transmission resource allocation. The allocation of an inefficient HARQ process increases the processing time in the HARQ procedure.

Hereinafter, a method for managing HARQ processes that efficiently support SL transmission in a mobile communication system such as LTE or NR is provided.

The key points of the method for managing HARQ processes according to the present disclosure are as follows. In the existing LTE or NR, the UE receives the HARQ process ID of the transmission HARQ process for transmitting data or the receiving HARQ process for receiving data from the base station. However, the method for managing HARQ processes according to the present disclosure does not use the received HARQ process ID as it is, but maps the received HARQ process ID to a new HARQ process ID, and operates the HARQ process with the new HARQ process ID. In addition, the method for managing HARQ processes according to the present disclosure notifies whether the HARQ processes are full to a data source.

The method for managing HARQ processes according to an embodiment of the present disclosure is a method for managing HARQ processes of a UE having a plurality of HARQ processes, and will be described in detail with reference to FIGS. 6 to 8.

Figure 6:
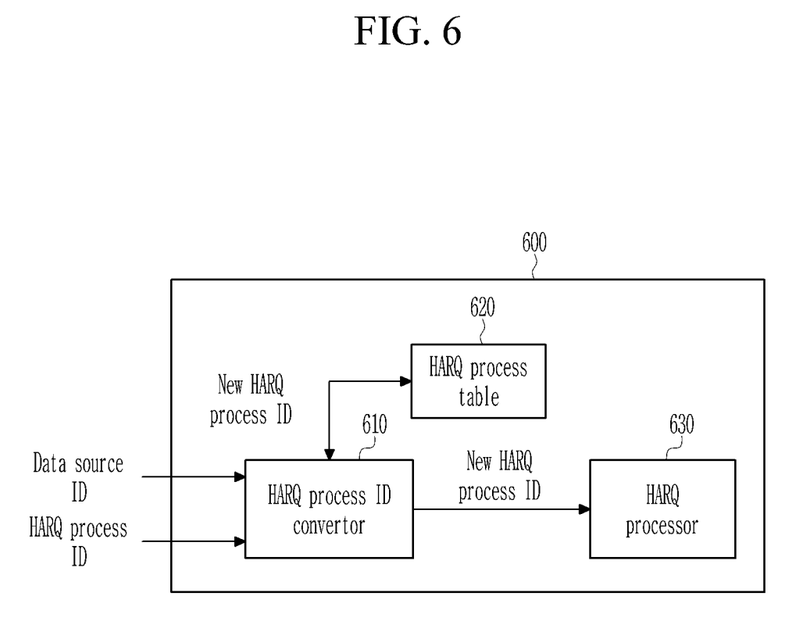
FIG. 6 is a diagram illustrating an apparatus for managing a HARQ process according to an embodiment.
Figure 7:
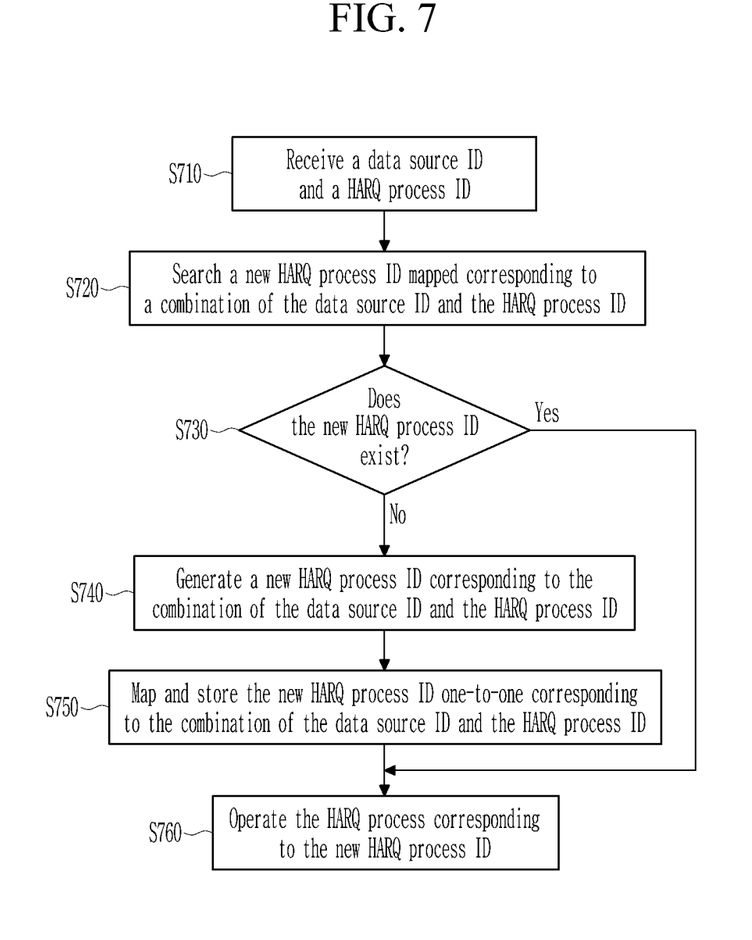
FIG. 7 is a flowchart illustrating a method for managing HARQ processes according to an embodiment.

FIG. 6 is a diagram illustrating an apparatus for managing a HARQ process according to an embodiment, and FIG. 7 is a flowchart illustrating a method for managing HARQ processes according to an embodiment.

Referring to FIG. 6, the apparatus for managing HARQ processes 600 includes a HARQ process ID convertor 610, a HARQ process table 620, and a HARQ processor 630. This apparatus for managing HARQ processes 600 may be implemented in the UE.

When the HARQ process ID convertor 610 receives a data source ID and a HARQ process ID through a control channel for transmitting control information for data transmission (S710), it searches whether a new HARQ process ID mapped corresponding to a combination of the data source ID and the HARQ process ID exists in the HARQ process table 620 (S720).

A new HARQ process ID mapped corresponding to a combination of the data source ID and the HARQ process ID is stored in the HARQ process table 620.

When the new HARQ process ID mapped corresponding to the combination of the data source ID and the HARQ process ID does not exist in the HARQ process table 620 (S730), the HARQ process ID convertor 610 generates a new HARQ process ID corresponding to the combination of the data source ID and the HARQ process ID (S740), and maps the new HARQ process ID one-to-one corresponding to the combination of the data source ID and the HARQ process ID, and stores the new HARQ process ID mapped to a combination of a data source ID and a HARQ process ID to the HARQ process table 620 (S750).

The HARQ process ID convertor 610 outputs the new HARQ process ID mapped to the combination of the data source ID and the HARQ process ID to the HARQ processor 630.

In this way, the HARQ process ID convertor 610 may output the new HARQ process ID previously mapped with respect to data having the same data source ID and HARQ process ID later.

The HARQ processor 630 operates the HARQ process corresponding to the new HARQ process ID mapped to the combination of the data source ID and the HARQ process ID (S760). That is, a plurality of HARQ processes are identified by new HARQ process IDs.

In addition, the HARQ processor 630 compares the number of new HARQ process IDs used in the HARQ process table 620 with a predetermined threshold, and generates a full control signal notifying the full of the HARQ processes when the number of new HARQ process IDs used in the HARQ process table 620 is greater than or equal to the predetermined threshold, and transmits the full control signal to the base station or UE corresponding to the data source. In this way, the base station or UE that has received the full control signal indicating the full of HARQ processes may not send more TB data than the maximum number of HARQ processes N_MAX_Process, and does not transmit the HARQ process ID through the control channel. Accordingly, there is an effect of preventing, in advance, the shortage of the HARQ processes that may occur by supporting the SL in addition to the existing UL/DL. In this case, the predetermined threshold may be set to the maximum number of HARQ processes N_MAX_Process. The maximum number of HARQ processes N_MAX_Process represents the sum of the number of HARQ processes of UL, DL, and SL. In general, the number of HARQ processes of UL, DL, and SL may be shared during network configuration.

When the number of new HARQ process IDs used in the HARQ process table 620 is less than the predetermined threshold, the HARQ processor 630 generates a full control signal notifying the release of the full of the HARQ processes, and transmits the full control signal to the base station or UE corresponding to the data source. Upon receiving the full control signal notifying the release of the full of the HARQ processes, the base station or the UE retransmits the HARQ process ID through the control channel, thereby resuming TB data transmission.

Meanwhile, the full control signal may be transmitted through a data channel.

Figure 8:
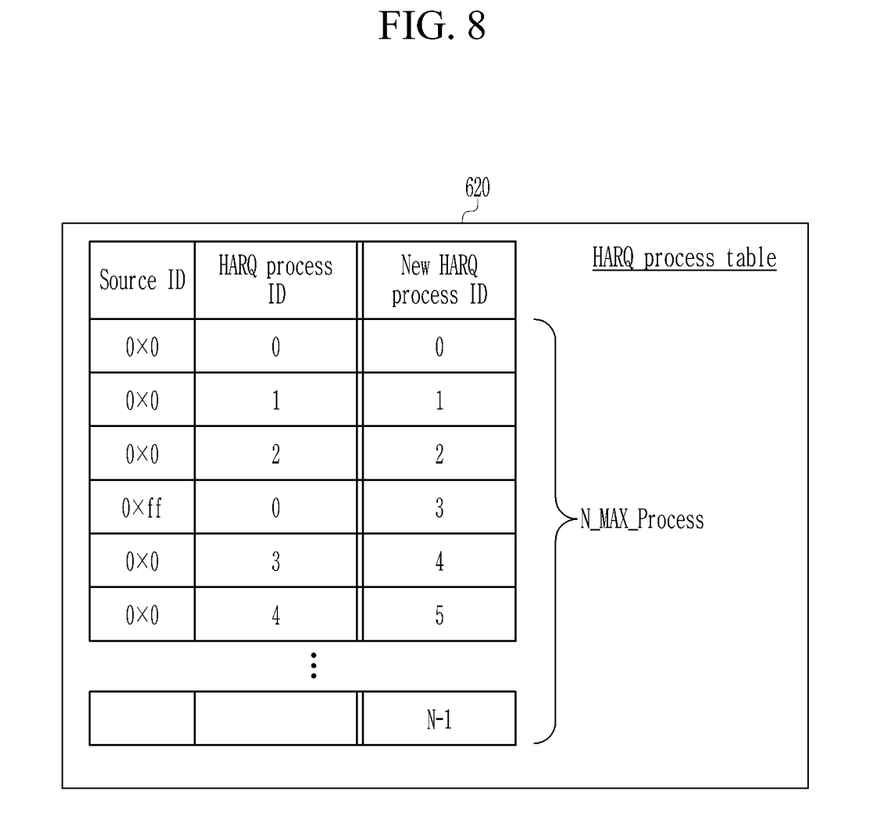
FIG. 8 is a diagram illustrating an example of the HARQ process table shown in FIG. 6.

FIG. 8 is a diagram illustrating an example of the HARQ process table shown in FIG. 6. FIG. 8 shows a HARQ process table when a UE is connected to a base station and simultaneously connected to another UE to perform HARQ processing.

Referring to FIG. 8, in the HARQ process table 620, a new HARQ process ID is mapped one-to-one corresponding to a combination of a data source ID and a HARQ process ID. The data source ID may indicate a base station (e.g., 0×0) and at the same time may indicate another UE (e.g., 0xff).

The maximum number of HARQ processes N_MAX_Process in the HARQ process table 620 varies depending on the performance of the UE, and may be set to 16 in the case of NR.

The method for managing HARQ processes according to another embodiment of the present disclosure is a method for managing HARQ processes of a base station or UE corresponding to a data source transmitting a HARQ processor ID, and will be described in detail with reference to FIG. 9.

Figure 9:
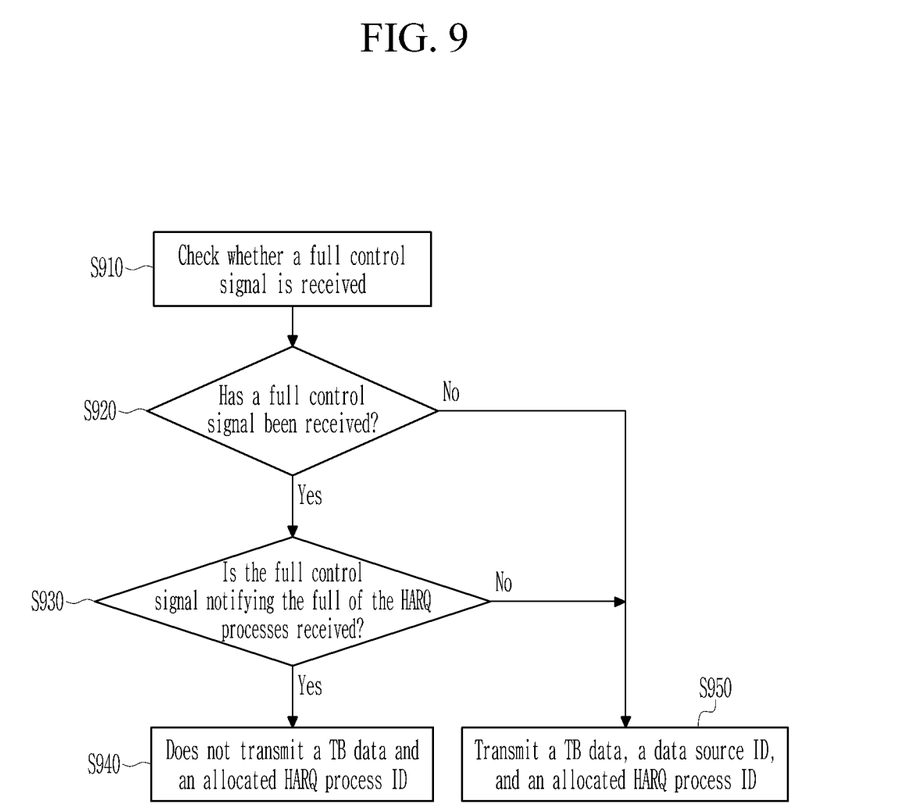
FIG. 9 is a flowchart illustrating a method for managing HARQ processes of a base station or UE corresponding to a data source according to an embodiment.

FIG. 9 is a flowchart illustrating a method for managing HARQ processes of a base station or UE corresponding to a data source according to an embodiment.

Referring to FIG. 9, the data source checks whether a full control signal is received (S910).

When the full control signal is not received (S920), the data source transmits TB data, a data source ID for the TB data, and an allocated HARQ process ID (S950). In this case, the TB data may be transmitted through the data channel, and the data source ID and the allocated HARQ process ID may be transmitted through the data channel or the control channel.

On the other hand, when the full control signal is received (S920), the data source checks whether the full control signal is a signal notifying the full of the HARQ processes or the signal notifying the release of the full of the HARQ processes (S930).

When the full control signal is a signal notifying the full of the HARQ processes (S930), the data source does not transmit the TB data and the allocated HARQ process ID (S940).

When the full control signal is a signal notifying the release of the full of the HARQ process (S930), the data source transmits the TB data, the data source ID for the TB data, and the allocated HARQ process ID (S950).

Figure 10:
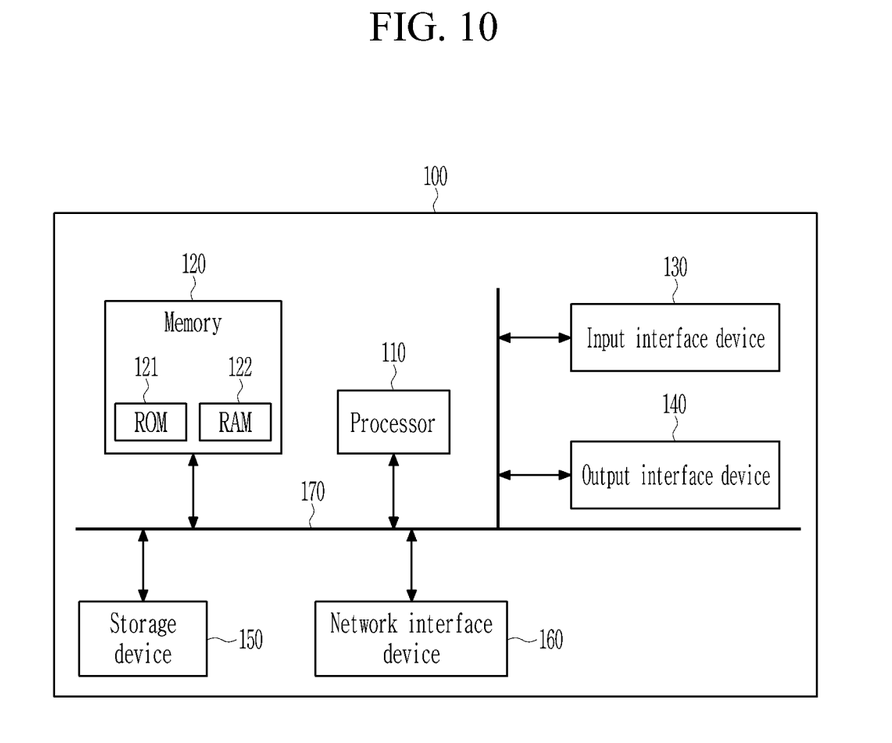
FIG. 10 is a diagram illustrating an apparatus for managing HARQ processes according to another embodiment.

FIG. 10 is a diagram illustrating an apparatus for managing HARQ processes according to another embodiment.

Referring to FIG. 10, the apparatus for managing HARQ processes 100 may represent a computing device in which the aforementioned method for managing HARQ processes is implemented.

The apparatus for managing HARQ processes 100 may include at least one of a processor 110, a memory 120, an input interface device 130, an output interface device 140, a storage device 150, and a network interface device 160. Each of the components may be connected by a common bus 170 to communicate with each other. In addition, each of the components may be connected through an individual interface or a separate bus centering on the processor 110 instead of the common bus 170.

The processor 110 may be implemented as various types such as an application processor (AP), a central processing unit (CPU), a graphics processing unit (GPU), etc., and may be any semiconductor device that executes a command stored in the memory 120 or the storage device 150. The processor 110 may execute program commands stored in at least one of the memory 120 and the storage device 150. The processor 110 stores program commands for implementing at least some functions of the HARQ process ID convertor 610 and the HARQ processor 630 described with reference to FIG. 6 in the memory 120, and may control to perform the operation described with reference to FIGS. 6 to 9.

The memory 120 and the storage device 150 may include various types of volatile or non-volatile storage media. For example, the memory 120 may include a read-only memory (ROM) 121 and a random access memory (RAM) 122. The memory 120 may be located inside or outside the processor 110, and the memory 120 may be connected to the processor 110 through various known means.

The memory 120 or the storage device 150 may store the HARQ process table 620 shown in FIG. 6.

The input interface device 130 is configured to provide data to the processor 110. For example, the input interface device 130 may provide the data source ID and the HARQ process ID received through the control channel to the processor 110.

The output interface device 140 is configured to output data from the processor 110.

The network interface device 160 may transmit or receive data with a base station or another UE through a wired network or a wireless network.

At least some of the method and apparatus for managing HARQ processes according to an embodiment of the present disclosure may be implemented as a program or software executed in a computing device, and the program or software may be stored in a computer-readable medium.

In addition, at least a part of the method and apparatus for managing HARQ processes according to the embodiment of the present disclosure may be implemented as hardware capable of being electrically connected to the computing device.

According to an embodiment, the terminal can transmit the sidelink as well as the existing uplink and downlink without error by managing the HARQ processes for the uplink, the downlink, and the sidelink without the aid of the base station, and it is possible to efficiently use the existing HARQ process resources without separately using the HARQ processes of the sidelink.

The components described in the example embodiments may be implemented by hardware components including, for example, at least one digital signal processor (DSP), a processor, a controller, an application-specific integrated circuit (ASIC), a programmable logic element such as an FPGA, other electronic devices, or combinations thereof. At least some of the functions or the processes described in the example embodiments may be implemented by software, and the software may be recorded on a recording medium. The components, functions, and processes described in the example embodiments may be implemented by a combination of hardware and software. The method according to embodiments may be embodied as a program that is executable by a computer, and may be implemented as various recording media such as a magnetic storage medium, an optical reading medium, and a digital storage medium. Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing, or to control an operation of a data processing apparatus, e.g., by a programmable processor, a computer, or multiple computers. A computer program(s) may be written in any form of programming language, including compiled or interpreted languages, and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network. Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic or magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read-only memory (CD-ROM), a digital video disk (DVD), etc., and magneto-optical media such as a floptical disk and a read-only memory (ROM), a random access memory (RAM), a flash memory, an erasable programmable ROM (EPROM), and an electrically erasable programmable ROM (EEPROM), and any other known computer readable media. A processor and a memory may be supplemented by, or integrated into, a special purpose logic circuit. The processor may run an operating system (OS) and one or more software applications that run on the OS. The processor device may also access, store, manipulate, process, and create data in response to execution of the software. For the purpose of simplicity, the description of a processor device is used as singular; however, one skilled in the art will appreciate that a processor device may include multiple processing elements and/or multiple types of processing elements. For example, a processor device may include multiple processors or a processor and a controller. In addition, different processing configurations are possible, such as parallel processors. Also, non-transitory computer-readable media may be any available media that may be accessed by a computer, and may include both computer storage media and transmission media. The present specification includes details of a number of specific implementations, but it should be understood that the details do not limit any disclosure or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination. Similarly, even though operations are described in a specific order in the drawings, it should not be understood as the operations needing to be performed in the specific order or in sequence to obtain desired results or as all the operations needing to be performed. In a specific case, multitasking and parallel processing may be advantageous. In addition, it should not be understood as requiring separation of various apparatus components in the above-described example embodiments in all example embodiments, and it should be understood that the above-described program components and apparatuses may be incorporated into a single software product or may be packaged in multiple software products. It should be understood that the embodiments disclosed herein are merely illustrative and are not intended to limit the scope of the disclosure. It will be apparent to one of ordinary skill in the art that various modifications of the embodiments may be made without departing from the spirit and scope of the claims and their equivalents.

What is claimed is:

1. A method for managing HARQ processes in a terminal of a mobile communication system supporting uplink, downlink, and sidelink transmission, the method comprising:

receiving a data source ID and a HARQ process ID set to at least one of the uplink, downlink, and sidelink transmission through a control channel;

searching a new HARQ process ID mapped corresponding to the combination of the data source ID and the HARQ process ID with reference to the HARQ process table; and operating a HARQ process corresponding to the new HARQ process ID; and transmitting a full control signal notifying a full or a full release of the HARQ processes to a data source corresponding to the data source ID based on the number of HARQ process IDs being used in the HARQ process table.

2. The method of claim 1, further comprising:
when there is no new HARQ process ID mapped corresponding to the combination of the data source ID and the HARQ process ID in the HARQ process table, generating a new HARQ process ID corresponding to the combination of the data source ID and the HARQ process ID; and
mapping the generated new HARQ process ID to the combination of the data source ID and the HARQ process ID and storing the new HARQ process ID in the HARQ process table.

3. The method of claim 1, wherein the transmitting a full control signal includes:
comparing the number of HARQ process IDs used in the HARQ process table with a predetermined threshold;
when the number of HARQ process IDs is equal to or greater than the predetermined threshold, generating a full control signal notifying a full of HARQ processes; and
transmitting the full control signal through a control channel or a data channel.

4. The method of claim 3, wherein the transmitting a full control signal further includes, when the number of the HARQ process IDs is less than the predetermined threshold, generating a full control signal notifying the full release of HARQ processes.

5. A method for managing HARQ processes in a data source for transmitting data of a mobile communication system supporting uplink, downlink, and sidelink transmission, the method comprising:
checking whether a full control signal notifying full or full release of the HARQ processes transmitted by a receiving terminal is received based on the number of HARQ process IDs used in a HARQ process table of the receiving terminal receiving the data; and
determining whether to transmit data to the receiving terminal according to the full control signal,
wherein a new HARQ process ID is stored in the HARQ process table corresponding to a combination of a data source ID and a HARQ process ID allocated to the data.

6. The method of claim 5, wherein the determining includes, when receiving a full control signal notifying the full of the HARQ processes, stopping transmission of data and a HARQ process ID allocated to the data.

7. The method of claim 5, wherein the determining includes transmitting data, a data source ID of the data source, and an HARQ process ID allocated to the data, upon receiving a full control signal notifying full release of the HARQ processes.

8. The method of claim 7, wherein the transmitting includes:
transmitting the data through a data channel; and
transmitting the data source ID and the HARQ process ID through the data channel or the control channel.

9. An apparatus for managing HARQ processes in a mobile communication system supporting uplink, downlink, and sidelink transmission, the apparatus comprising:
a memory; and
a processor operably connected to the memory,
wherein the processor is configured to:
receive a data source ID and a HARQ process ID set in at least one of the uplink, downlink, and sidelink transmission through the control channel,
search a new HARQ process ID mapped corresponding to the combination of the data source ID and the HARQ process ID with reference to the HARQ process table,; and
operate a HARQ process corresponding to the new HARQ process ID, and
transmit a full control signal notifying a full or full release of the HARQ processes to a data source corresponding to the data source ID based on the number of HARQ process IDs being used in the HARQ process table.

10. The apparatus of claim 9, wherein the processor is configured to, when there is no new HARQ process ID mapped corresponding to the combination of the data source ID and the HARQ process ID in the HARQ process table, generate a new HARQ process ID corresponding to the combination of the data source ID and the HARQ process ID, map the generated new HARQ process ID to the combination of the data source ID and the HARQ process ID, and store the new HARQ process ID in the HARQ process table.

11. The apparatus of claim 9, wherein the processor is configured to generate a full control signal notifying a full of HARQ processes when the number of HARQ process IDs is equal to or greater than the predetermined threshold, and generate a full control signal notifying the full release of HARQ processes when the number of the HARQ process IDs is less than the predetermined threshold.

12. The apparatus of claim 9, wherein the data source corresponding to the data source ID indicates a base station or other terminal that has transmitted data.

* * * * *